(12) United States Patent
Odaohhara

(10) Patent No.: US 6,661,200 B2
(45) Date of Patent: Dec. 9, 2003

(54) RECHARGEABLE POWER SUPPLY SYSTEM AND METHOD OF PROTECTION AGAINST ABNORMAL CHARGING

(75) Inventor: Shigefumi Odaohhara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 10/102,029

(22) Filed: Mar. 20, 2002

(65) Prior Publication Data

US 2002/0167294 A1 Nov. 14, 2002

(30) Foreign Application Priority Data

May 8, 2001 (JP) ........................... 2001-137264

(51) Int. Cl.[7] .................. H01M 10/44; H01M 10/46
(52) U.S. Cl. ...................................... 320/132
(58) Field of Search ................... 320/132, 134, 320/136; 324/427, 428, 433

(56) References Cited

U.S. PATENT DOCUMENTS 5,493,197 A * 2/1996 Eguchi et al.
5,847,544 A * 12/1998 Eguchi

FOREIGN PATENT DOCUMENTS

JP 6-86469 3/1994
JP 2000-102185 4/2000

* cited by examiner

Primary Examiner—Edward H. Tso
(74) Attorney, Agent, or Firm—J. Bruce Schelkopf

(57) ABSTRACT

An intelligent battery comprising a battery cell for charging and discharging; a voltage detection circuit for detecting voltage of the battery cell; a current detection circuit for detecting charging current; a charging-stop FET for stopping charging for the battery cell; and a CPU for activating the charging-stop FET based on voltage detected by the voltage detection circuit, wherein before the voltage reaches a voltage for activation of the charging-stop FET, when the charging current value detected for the battery capacity by the current detection circuit is larger than a reference, the CPU determines that an abnormal state occurs, and activates the charging-stop FET. The present invention provides, in part, a battery, which is safer even if dual accidental malfunctions occur.

19 Claims, 8 Drawing Sheets

[Figure 1]
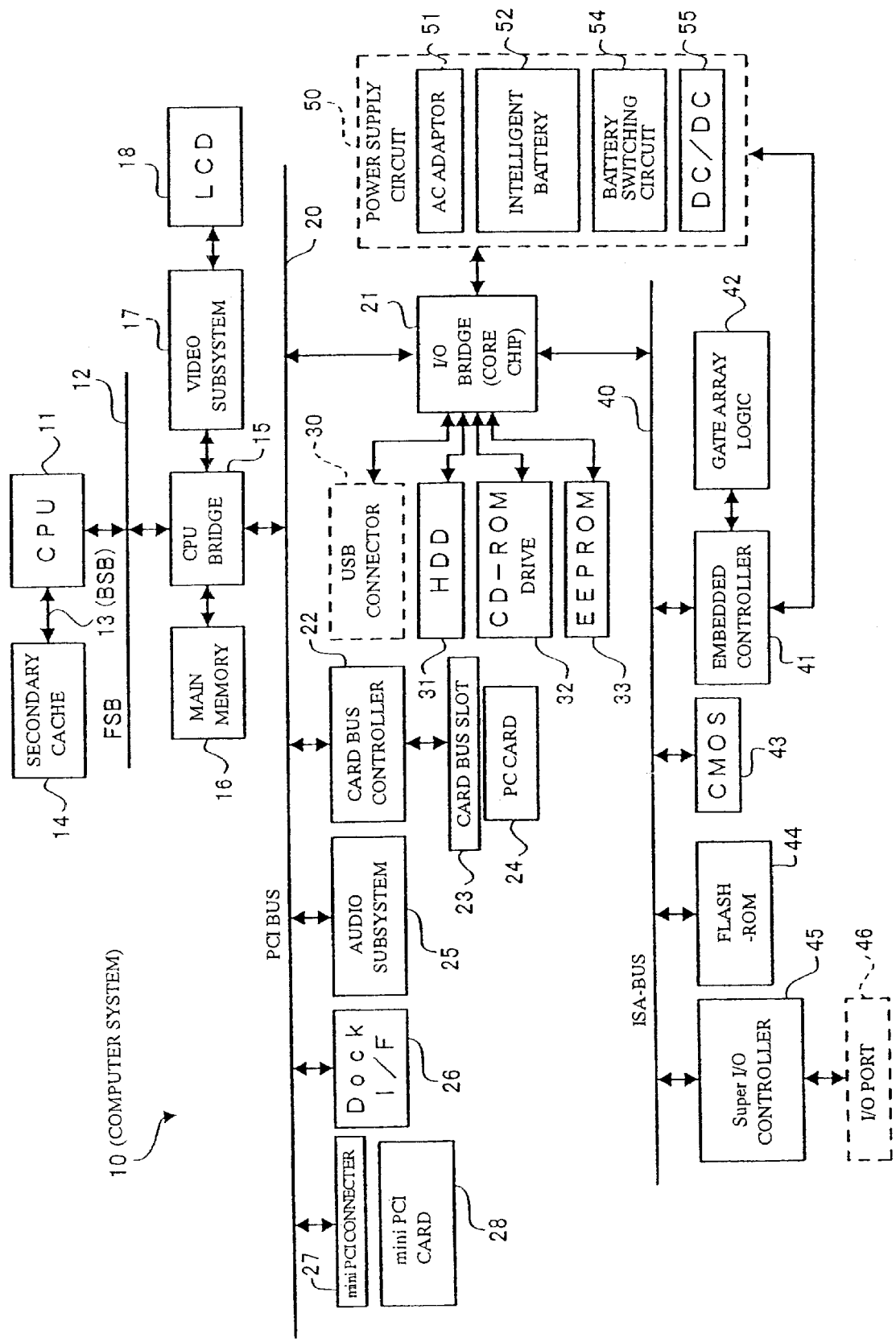

[Figure 2]
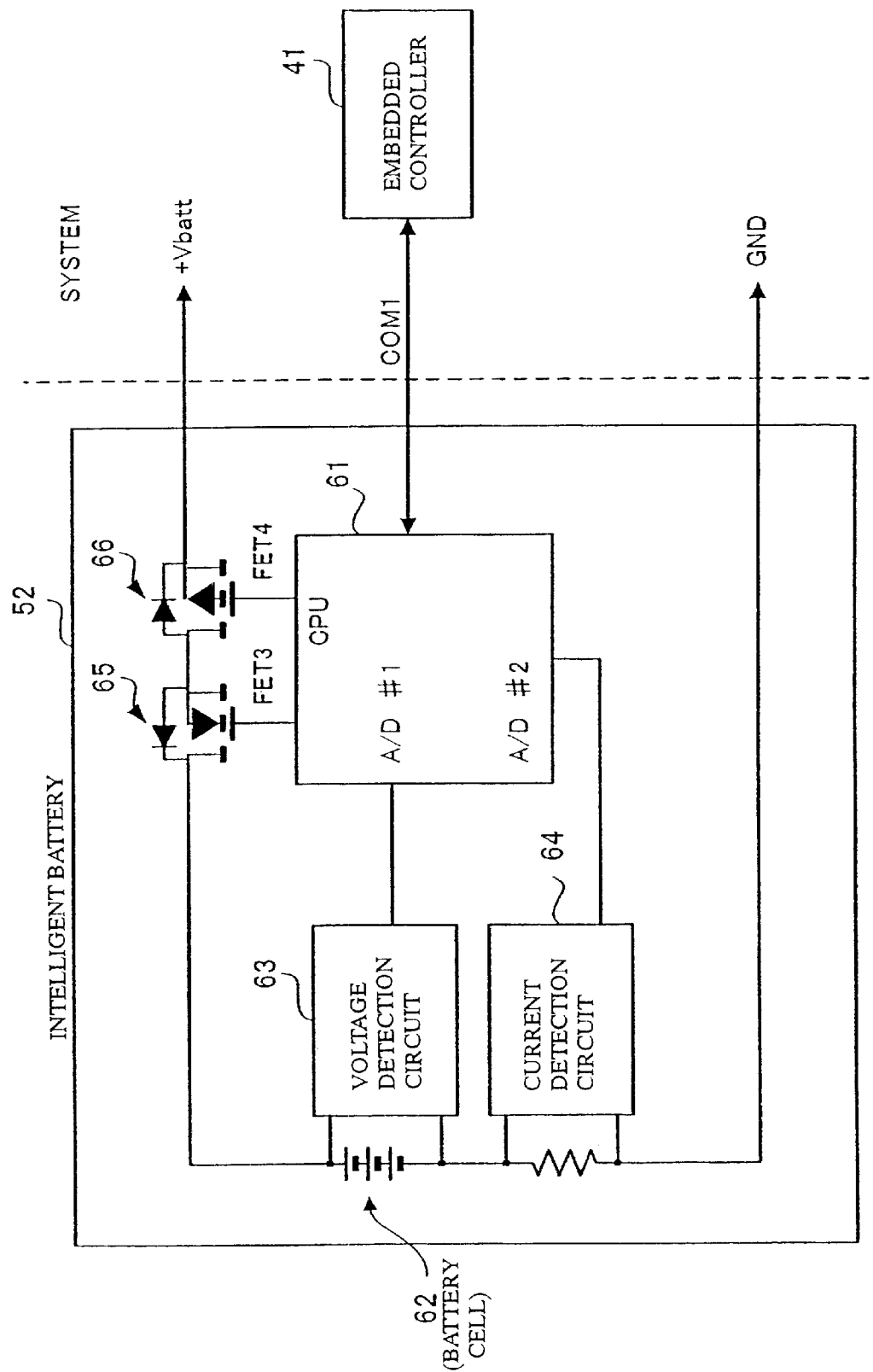

[Figure 3]
(a)
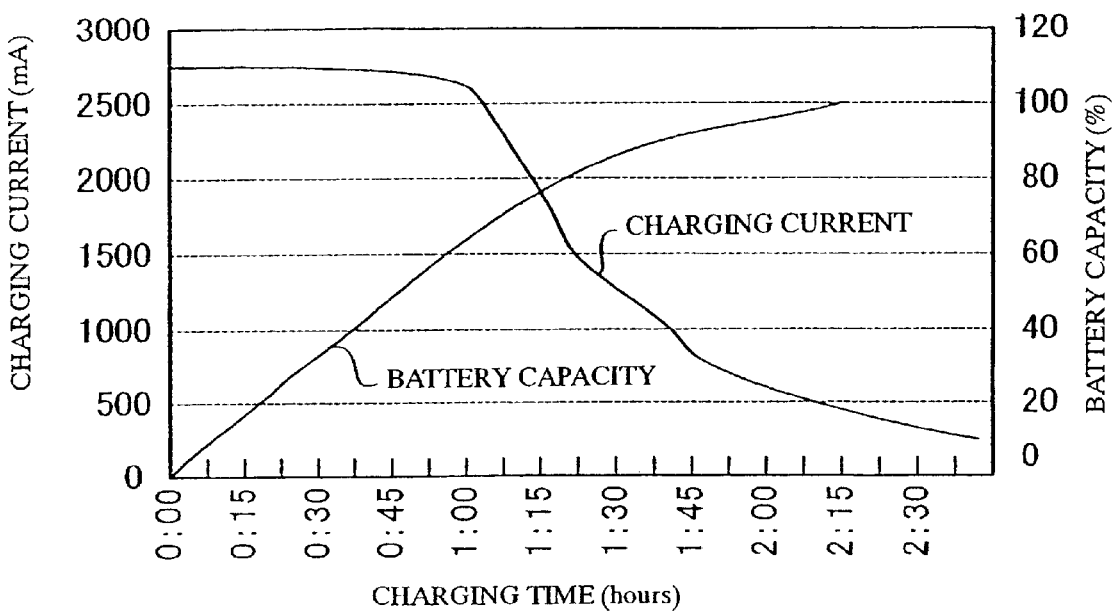
(b)
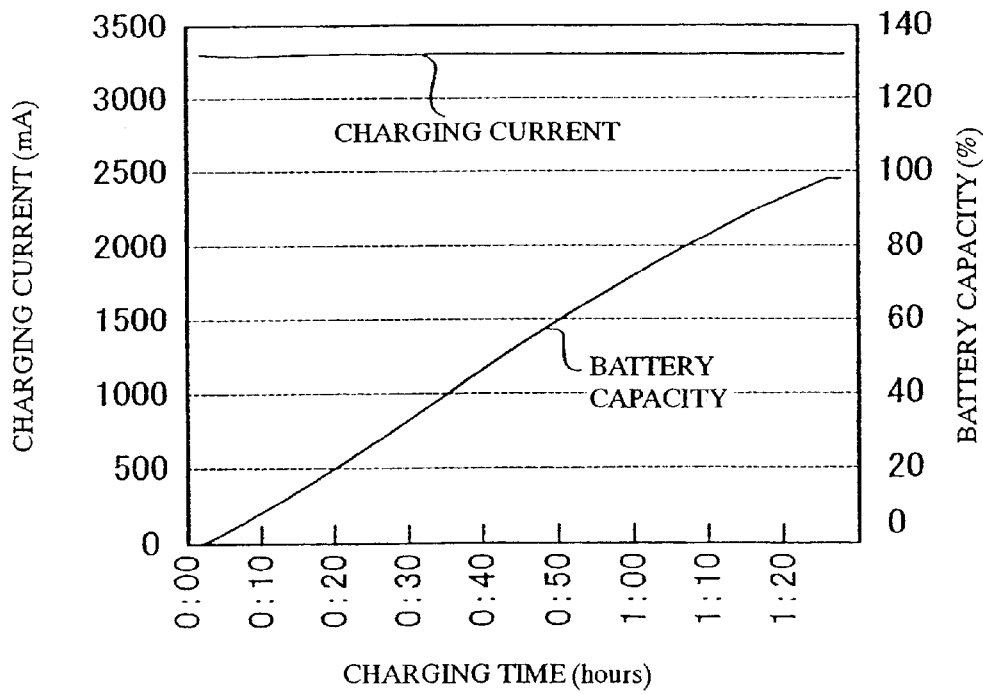

[Figure 4]
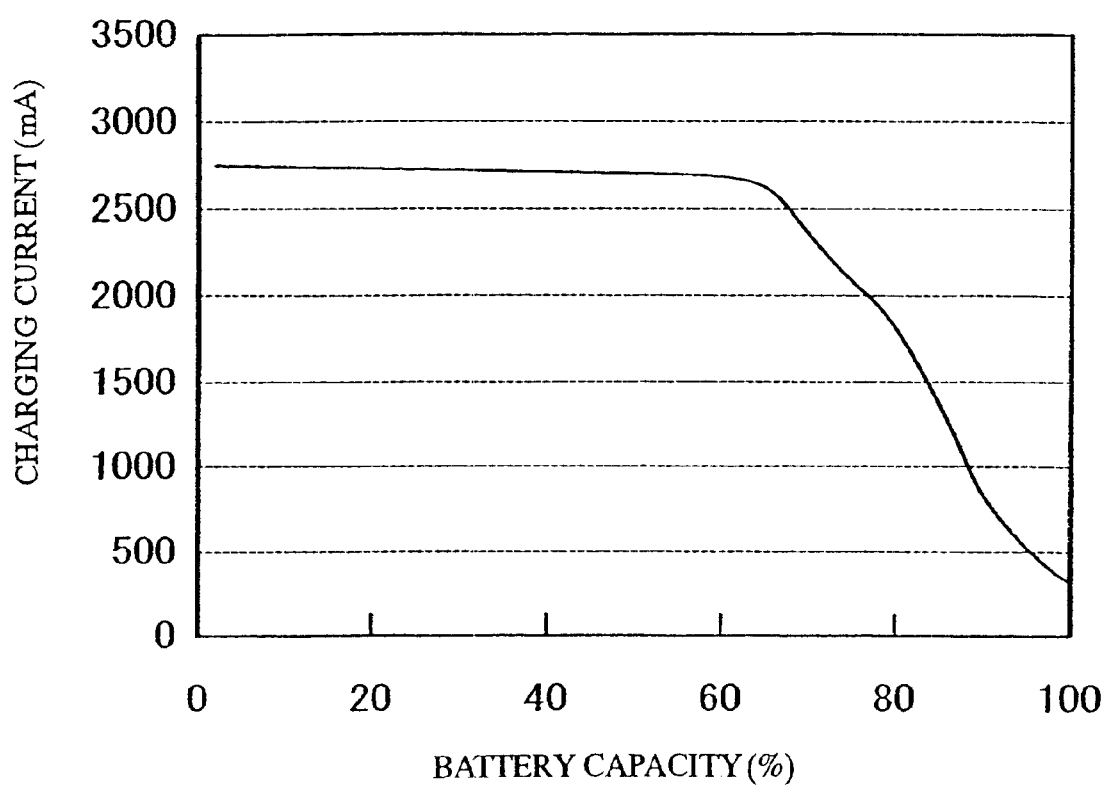

[Figure 5]
(a)
| BATTERY CAPACITY (%) | ABNORMAL DETECTED CURRENT VALUE (A) |
|---|---|
| 0-70 | 3.0 |
| 71-80 | 2.5 |
| 81-90 | 2.0 |
| 91-95 | 1.3 |
| 96-100 | 0.8 |
(b)
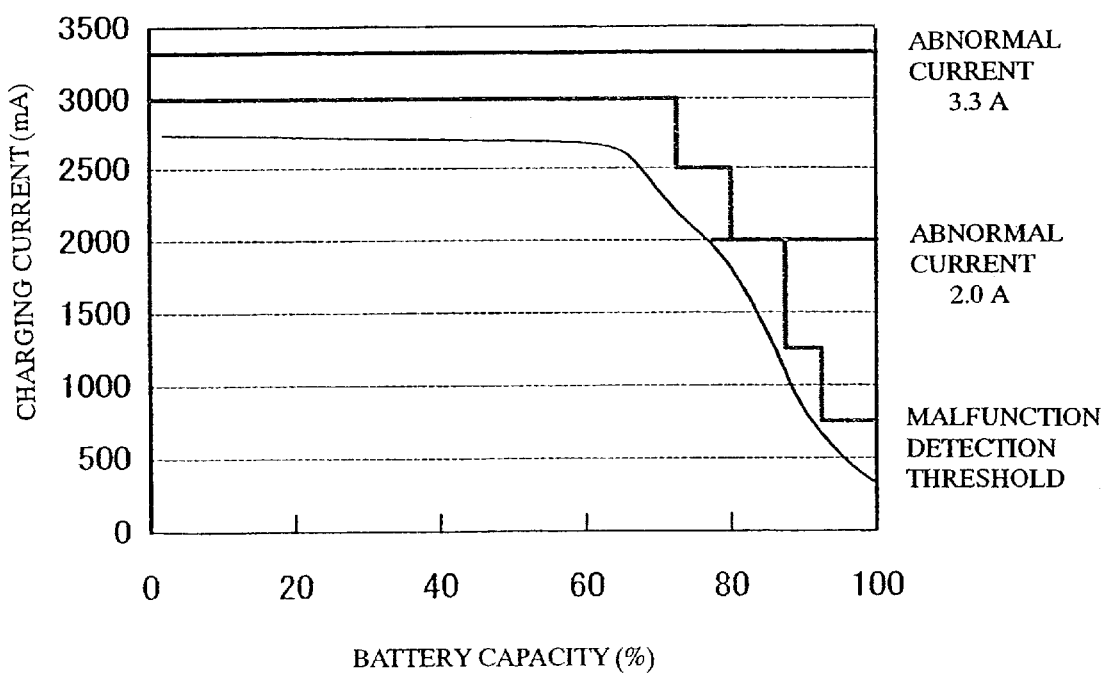

[Figure 6]
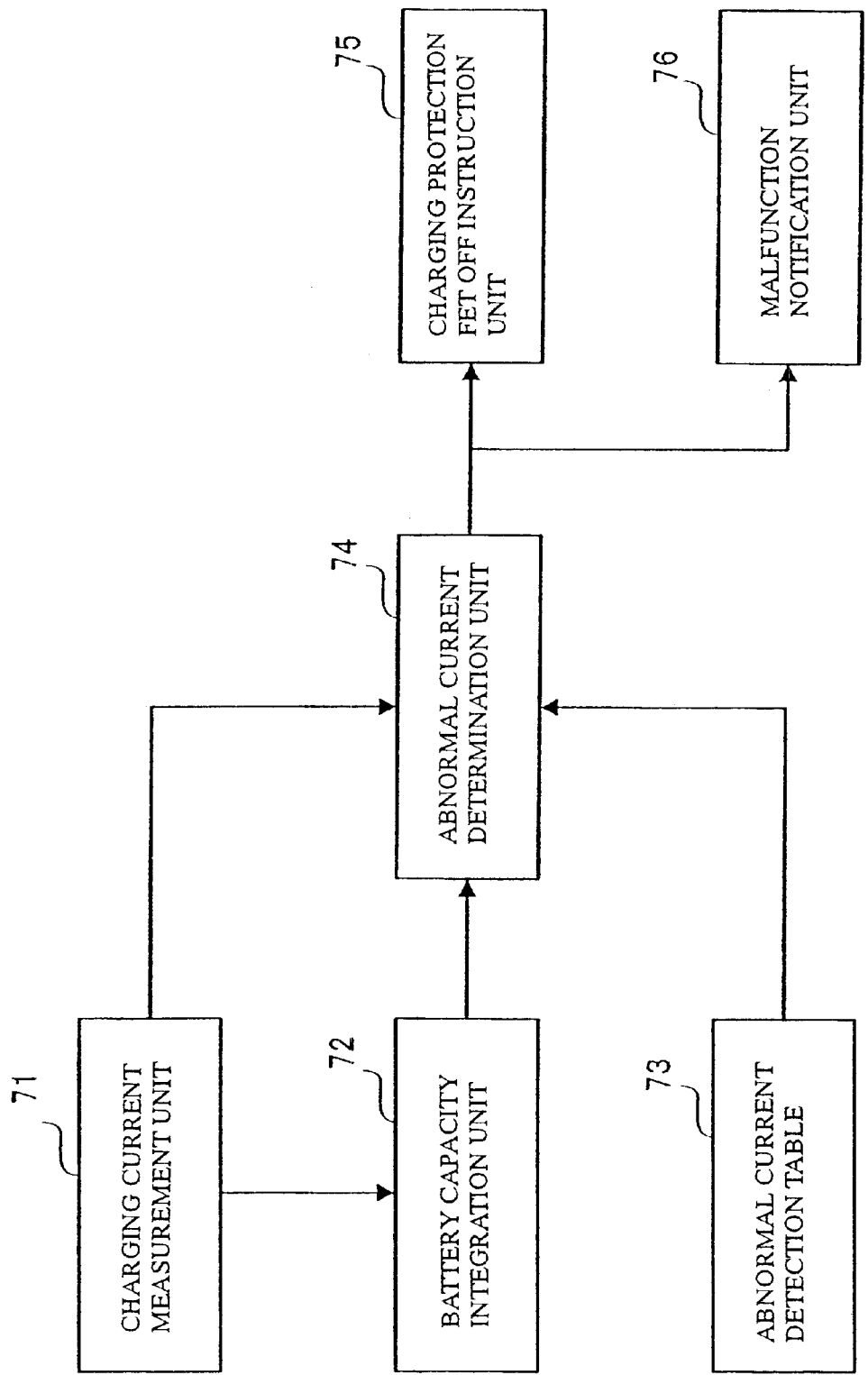

[Figure 7]
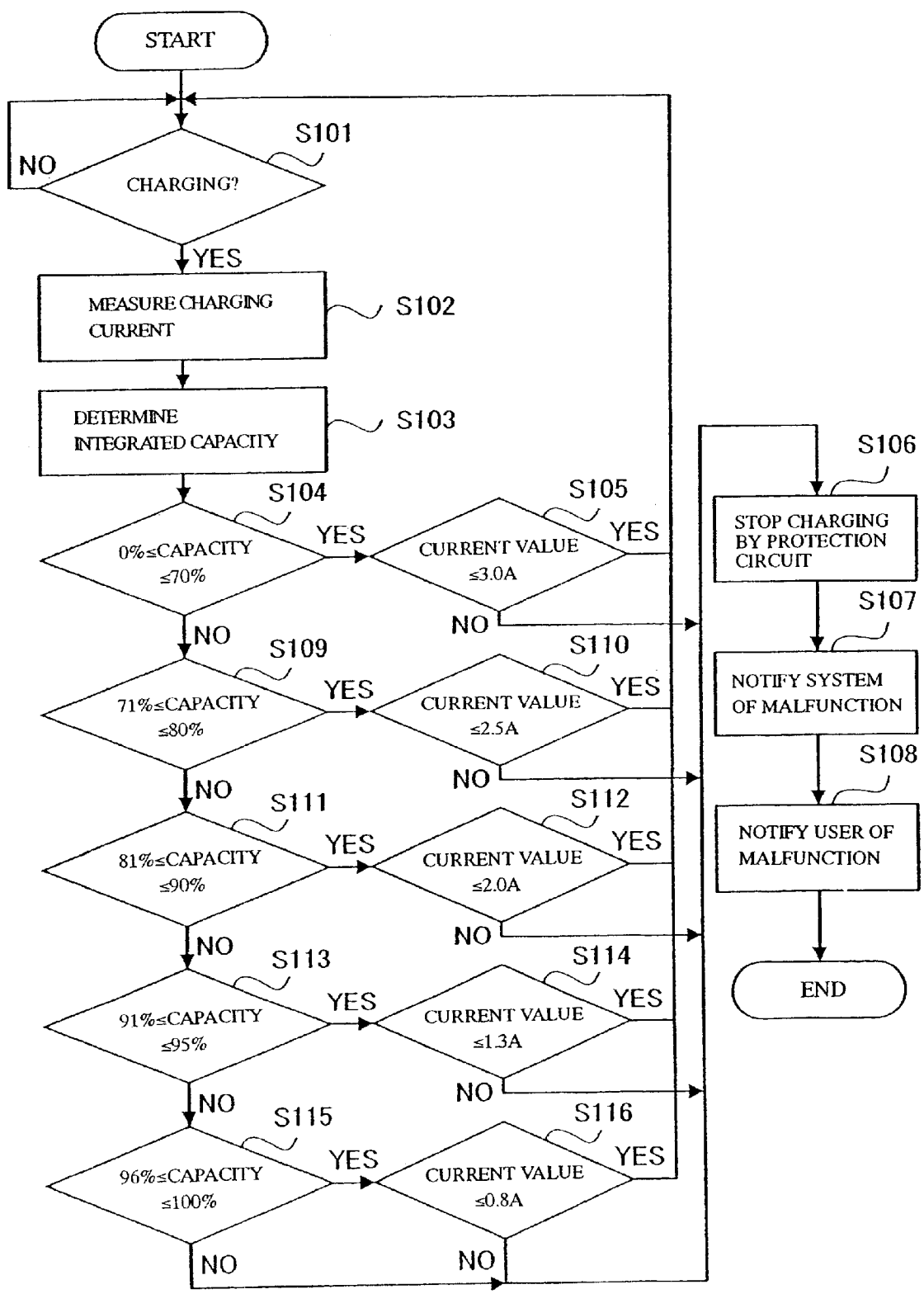

[Figure 8]
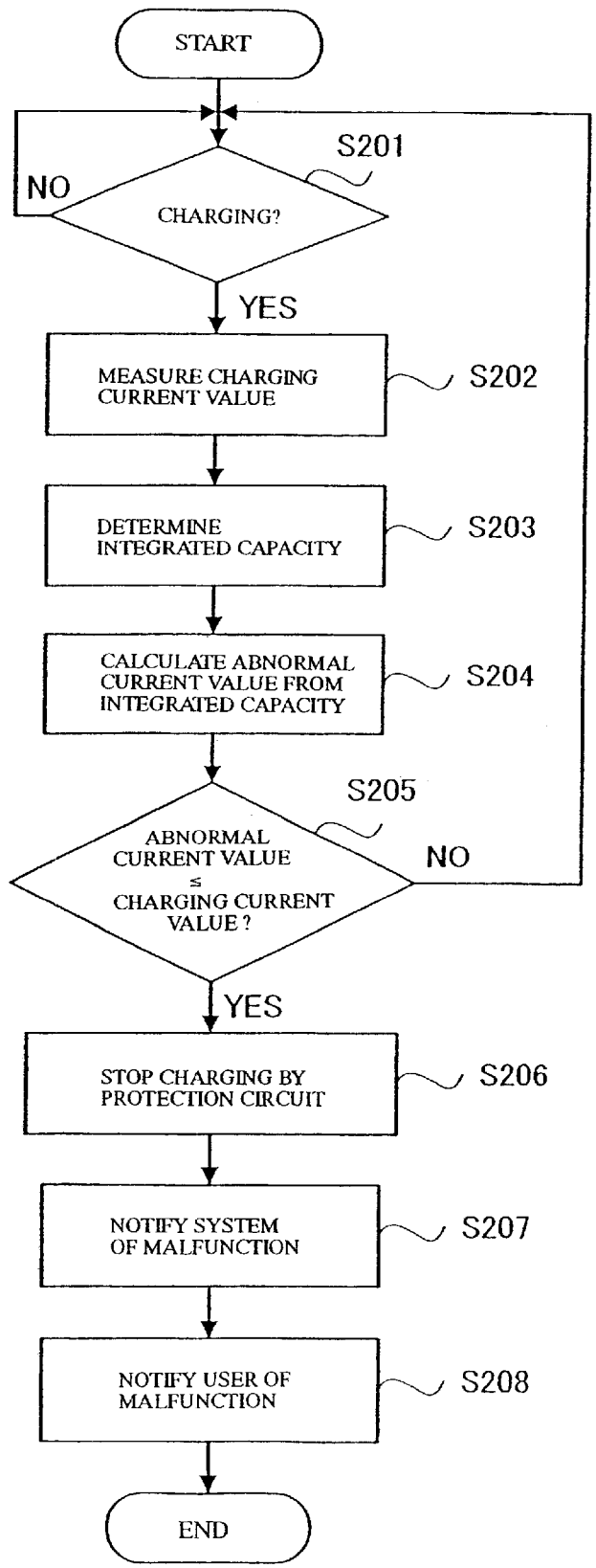

RECHARGEABLE POWER SUPPLY SYSTEM AND METHOD OF PROTECTION AGAINST ABNORMAL CHARGING

BACKGROUND OF THE INVENTION

1. Field of the Invention

The present invention relates to a power supply system having a battery that can be used by repeated charging/discharging (secondary battery), more particularly, to a power supply system having a protection facility against abnormal charging.

2. Background of Related Art

In various devices and apparatuses (such as notebook-sized personal computers (notebook PCs), PDAs, information terminal equipment including mobile phones, Mini Disc (MD) drives, and video cameras), secondary batteries are extensively employed as a battery that can be used many times by repeated charging/discharging. As a secondary battery, often nickel-hydrogen batteries or nickel-cadmium batteries are used, where such use is employed typically since these types of batteries are inexpensive and have larger capacity. Additionally, other types including lithium ion batteries, having higher energy density per unit weight than the nickel-cadmium batteries, and lithium-polymer batteries, that uses a solid polymer instead of a liquid electrolyte, may also be used.

If a secondary battery such as a nickel-hydrogen battery, a nickel-cadmium battery, a lithium ion battery, or a lithium-polymer battery, is in an over-charging state or an over-discharging state, problems such as lowered performance, damaged electrodes, or short-circuits inside the battery may occur.

For example, in Published Unexamined Patent Application No. 6-86469 (Japan Patent Office) the specification discloses a technique for the alarming of short-circuits by generating signals based on the detection of a lowered battery voltage and short-circuits within the battery. Additionally, in Published Unexamined Patent Application No. 2000-102185 Japan Patent Office), the specification discloses a technique wherein each secondary battery cell in a first battery group and each secondary battery cell in a second battery group are connected separately for monitoring/controlling purposes, such that if an internal short-circuit occurs in one of the battery groups, a short-circuit current is prevented from flowing into the secondary battery cells in the other battery group.

However, in above-referenced Published Unexamined Patent Application Nos. 6-86469 and 2000-102185 described above and incorporated by reference herein, when an internal short circuit occurs in a condition where the battery is charged to a voltage above a predetermined voltage due to a malfunction of the apparatus, it is impossible to prevent a battery from being in a dangerous state while short-circuit current can be prevented from flowing into batteries. As a result, it is generally known that when an internal short-circuit in a battery cell occurs in addition to overvoltage in the battery, the condition of the battery becomes dangerous.

In order to charge a secondary battery (battery-pack) a charger is often used with an alternating current (AC) adapter. When a short-circuit breakdown occurs in either a switching transistor in the charger or a short-circuit prevention transistor for preventing short-circuit in the charger, the AC adapter and the battery short-circuit electrically, resulting in an abnormal charging of the battery (first error). In this case, charging continues until a primary protection circuit in the battery pack goes into operation. At this point, the battery voltage, for example in the case of lithium-ion battery, is about 4.35 V/cell. If additionally a short-circuit occurs in the battery cell, a dangerous state (second error) is possible. These dangerous states as well as a situation where the battery is in a high temperature environment should be taken into consideration in designing.

Currently, intelligent batteries having a CPU built-in in a battery pack (secondary battery) are widely used. For example, a lithium ion battery constituting an intelligent battery is used, in which a charging stop FET (charging protection circuit) and a discharging stop FET (discharging protection circuit) are built in a battery pack. The CPU in the battery pack monitors the voltage in the battery by inputting a signal from a voltage detection circuit, then analog-to-digital (A/D) converting the signal inside it. In this battery pack, when the voltage reached 4.35 V or higher, for example, it is determined that abnormal charging occurs, and the charging is aborted by turning off the charging stop FET. Since the battery voltage in full charging (100% charging) state is 4.2 V (±50 mV), the current design in which abnormal charging is detected at 4.35 V/cell is considered to be proper taking detection error and other factors into consideration.

However, while a safety state can be maintained in a normal condition, a dangerous state becomes possible, when in a condition charged to 4.35 V further occurs a malfunction such as internal short-circuit in the battery cell. It is therefore necessary to accommodate the worst case taking conditions such as ambient temperature into consideration.

SUMMARY OF THE INVENTION

The present invention is made to solve and overcome the technical problems described above, as well as other known limitations in the art. It is an object of the present invention to provide a battery, which is safer, even where double accidental malfunctions occur.

An object of the present invention is to operates to maintain safety, such that when a short-circuit occurs in a battery cell, and when the battery is charged to a voltage above a predetermined voltage due to a malfunction of a connected charger (or a portion of an apparatus), to above charging by detecting a malfunction of the charger (or the portion of the device) before the conventional first overvoltage protection facility is activated.

Therefore, in one aspect, the present invention is a power supply system with a battery for supplying power to a main system, comprising: charging current measuring means for measuring charging current for the battery; battery capacity calculation means for calculating (integrating) battery capacity of the battery; detection means for detecting malfunction occurring in the battery based on a charging current value obtained and the battery capacity calculated (malfunction occurrence detection means); protection facility activating means for activating a protection facility based on detection of malfunction occurrence; and notification means for notifying the main system of malfunction occurrence based on detection of the malfunction.

The detection means (malfunction occurrence detection means) is preferably adapted, for example, to detect malfunction occurrence based on information in a table for malfunction detection, showing the relation between battery capacity and malfunction detection current value. The detection means can also be adapted to detect malfunction occurrence based on an equation representing the relation between battery capacity and charging current value, which equation is separately defined according to battery capacity.

In another aspect, the present invention is also a computer device, comprising: a main system for data processing; and an intelligent battery for supplying power to the main system, wherein the intelligent battery comprises: a battery cell for charging and discharging; a current detection circuit for detecting charging current for the battery cell; a CPU for calculating battery capacity by integrating detected charging current, and recognizing malfunction occurrence occurring in the battery based on charging current value detected by the current detection circuit and the battery capacity calculated; and a protection circuit for performing stop operation according to instruction from the CPU based on recognition of malfunction by the CPU.

In a further aspect, the present invention may also be understood to be a battery connected to a main system of a computer device or the like (intelligent battery). Thus, a battery according to the present invention, comprises: a battery cell; a voltage detection circuit for detecting voltage for the battery cell; a current detection circuit for detecting charging current for the battery cell; a charging stop unit for stopping charging for the battery cell; and a control unit for activating the charging stop unit based on voltage detected by the voltage detection circuit, wherein before the voltage reaches a voltage for activating the charging stop unit, the control unit detects an abnormal state based on a charging current value detected by the current detection circuit, and activates the charging stop unit.

In another aspect, the present invention is a method for protecting a battery from abnormal charging, comprising: measuring a charging current value for the battery; calculating integrated capacity for the battery; and activating a protection facility when the charging current value measured for the calculated integrated capacity is larger than a predetermined value. The method is preferably characterized in that the protection facility is activated based on information such as table information or an equation, specifying a reference value representing a charging current value at which a malfunction is detected for an integration capacity, since malfunction occurring can be detected as soon as abnormal current for an integrated capacity flows. The protection method can also provide a battery with excellent safety since the protection facility can be activated in the state where the integrated capacity is less than 100%.

In another aspect, a method for protecting from abnormal charging according to the present invention is characterized for example, in that it comprises: recognizing that a battery is connected to an apparatus such as a typical notebook PC with a charger for constant-current/constant-voltage charging, by using ID or the like that is identification information delivered from the apparatus; measuring charging current value when the battery is charged while switching from constant-current charging to constant-voltage charging; determining based on the measured charging current value whether abnormal charging occurs or not; and aborting charging when it is determined that abnormal charging occurs.

In yet another aspect, the present invention may also be understood as programs for enabling in a microcomputer contained a battery to perform each of these functions. The programs can be provided to a microcomputer a processing unit from a remote program transmission device via a network, for example. The program transmission device may be configured to comprise storage means such as a CD-ROM, a DVD, a memory or a hard-disc with the programs stored therein, and a transmission means for reading the programs from the storage means and transmitting the programs to a device for executing the programs, via connectors and networks such as Internet or LAN. The programs may be provided by using a storage medium such as CD-ROM.

BRIEF DESCRIPTION OF THE DRAWINGS

Other aspects, features, and advantages of the present invention will become more fully apparent from the following detailed description, the appended claims, and the accompanying drawings in which:

FIG. 1 shows a hardware configuration of a computer system to which an embodiment of the present invention is applied;

FIG. 2 shows a configuration of an intelligent battery comprising an abnormal charging protection function according to an embodiment of the present invention;

FIGS. 3(a) and (b) show charging characteristics of a lithium ion battery;

FIG. 4 shows a relationship between battery capacity and charging current in a normal charging;

FIGS. 5(a) and (b) show an example of determination criteria for malfunction detection used in an embodiment of the present invention;

FIG. 6 is a block diagram of processes performed in CPU of the intelligent battery;

FIG. 7 is a flow chart showing process flow in the case where the table shown in FIG. 5(a) is used; and, FIG. 8 is a flow chart showing a flow of abnormal state detection process based on numeral formulas.

DETAILED DESCRIPTION OF THE INVENTION

FIG. 1 is a diagram showing a hardware configuration of a computer system 10, for an embodiment of the present invention.

A computer device comprising this computer system 10 is configured as a notebook-size of personal computer (notebook PC) having a predetermined operation system (OS) loaded therein, preferably in compliance with Open Architecture Developer's Group (OADG) specification, for example.

In the computer system 10 of FIG. 1, a CPU 11 functions as the operational brain of the entire computer system 10, and executes various programs under the control of the OS. The CPU 11 is interconnected with various units via three buses: Front Side Bus (FSB) 12 as a system bus; Peripheral Unit interconnect (PCI) bus 20 as a bus for high speed I/O device; and Industry Standard Architecture (ISA) bus 40 as a bus for low speed I/O device. This CPU 11 is designed to increase processing speed by storing program codes or data in cache memories. Typically, a SRAM of about 128K bytes is integrated in the CPU 11 as a primary cache, although more and less are foreseen by the present invention. However, in order to make up for capacity shortage, a secondary cache 14 of about 512K to 2M bytes is connected to the CPU via a Back Side Bus (BSB) 13 that is an exclusive bus. It is also possible to eliminate the BSB 13 and to connect the secondary cache 14 to FSB 12 so as to avoid use of a package with many terminals, thereby reducing the cost.

The FSB 12 and the PCI bus 20 are in communication with a CPU bridge 15 called memory/PCI chip (host-PCI bridge). The CPU bridge 15 comprises a memory control function for controlling operation to access a main memory 16, a data buffer for buffering difference in data transfer rate between the FSB 12 and the PCI bus 20, and so on. The main memory 16 is a writable memory used as an area for reading an execution program for CPU 11, or a working area to which process data for the execution program is written. For example, it consists of several DRAM chips, equipped with a 64 MB chip for example, as its standard, having capability of expansion up to 320 MB. The execution program includes OS and various drivers for hardware operation of peripheral devices, application programs intended for specific work, and firmware such as Basic Input/Output System (BIOS) stored in a flash ROM 44 that will be described later.

A video subsystem 17 is a subsystem for implementing a function for video, and includes a video controller. The video controller processes a rendering instruction from the CPU 11 to write the processed rendering information to a video memory, and to read out the rendering information from the video memory so as to output it as rendering data on a liquid crystal display (LCD) 18.

The PCI bus 20 is a bus that allows relatively high-rate data transfer, and standardized by a specification with data bus width of 32 bits, 64 bits, maximum operation frequency of 33 MHz, 66 MHz, and maximum data transfer rate of 132 MB/sec, 528 MB/sec. An I/O bridge 21, a card-bus controller 22, an audio subsystem 25, a docking station interface (Doc I/F) 26, and a mini PCI connector 27 are connected to the PCI bus 20, respectively.

The card-bus controller 22 is an exclusive controller for directly coupling a bus signal on the PCI bus 20 with an interface connector (card bus) of a card-bus slot 23. A PC card 24 can be inserted to the card-bus slot 23. The docking station interface 26 is hardware for connecting a docking station (not shown) that is a function expansion device of the computer system 10. When a notebook PC is set in this docking station, the various hardware units connected to the internal buses of the docking station are connected to the PCI bus 20 via the docking station interface 26. A mini PCI card 28 is connected to the mini PCI connector 27.

The I/O bridge 21 comprises a bridge function between the PCI bus 20 and the ISA bus 40. It also comprises a DMA controller function, a programmable interruption controller (PCI) function, a programmable interval timer (PIT) function, Integrated Device Electronics (IDE) interface function, a Universal Serial Bus (USB) function, and a System Management Bus (SMB) interface function. The I/O bridge also preferably has a built-in real time clock (RTC).

The DMA controller function is a function for performing data transfer between peripheral devices such as FDD and the main memory 16 without passing through the CPU 11. The PCI function is a function for responding to interruption request (IRQ) from a peripheral device to execute a predetermined program (interruption handler). The PIT function is a function to generate timer signal with a predetermined frequency. An IDE hard-disc drive (HDD) 31 is connected to the interface implemented by the IDE interface, and a CD-ROM drive 32 is ATAPI (AT Attachment Packet Interface) connected to the interface. Instead of the CD-ROM drive 32, another type of IDE device such as Digital Versatile Disc (DVD) drive may be connected to the interface. External storage devices such as the HDD 31 or the CD-ROM drive 32, are accommodated, for example, in an accommodation place in a notebook PC body, called "media bay" or "device bay". Theses external storage devices equipped as a standard may be installed in an exchangeable and exclusive manner with other devices such as FDD and a battery pack.

The I/O bridge 21 is provided with a USB port, which is connected to a USB connector 30 disposed, for example, on a wall surface of a notebook PC body. An EEPROM 33 is connected to the I/O bridge 21 via SM bus. The EEPROM 33 is a memory for storing information such as a password or supervisor password registered by the user and the product serial number, and is non-volatile, and electrically rewritable for stored content.

The I/O bridge 21 is also connected to a power supply circuit 50. The power supply circuit 50 comprises an AC adapter 51 connected to a commercial main of AC 100 V, for example, for AC/DC conversion, an intelligent battery 52 as a battery (secondary battery), a battery switching circuit 54 for charging the intelligent battery 52 and switching power feeding paths from the AC adapter 51 and the intelligent battery 52, and a DC/DC converter (DC/DC) 55 for generating constant DC voltages used in the computer system 10, such as +15 V, +5 V, and +3.3 V. The intelligent battery 52 may removable from the main system as a battery pack, and may also be provided inside the housing of the main system.

In a core chip composing the I/O bridge 21, an internal register for managing a state of the power supply 10, and a logic for managing a state of the computer system 10 including the operation of the internal register (state machine) is provided. This logic transmits to/receives from the power supply circuit 50, various signals. The logic recognizes the actual state of feeding from the power supply circuit 50 to computer system 10 by the transmission/reception of the signals. The power supply 50 controls the power feeding to the computer system 10 according to instructions from the logic.

The ISA bus 40 is a bus with a data transfer rate lower than the PCI bus 20 (for example, bus width: 16 bits, maximum data transfer rate 4 MB/sec). An embedded controller 41 connected to a gate array logic 42, a CMOS 43, a flash ROM 44, and a Super I/O controller 45 are connected to the ISA bus 40. The ISA bus 40 is also used for connecting peripheral devices operating in relatively low speed such as keyboard/mouse controller. An I/O port 46 is connected to the Super I/O controller 45, and controls driving of FDD, input/output of parallel data via a parallel port (PIO), and input/output of serial data via a serial port (SIO).

The embedded controller 41 controls keyboard (not shown), and is connected to the power supply circuit 50 to support in part the power supply management function by means of a built-in power management controller (PMC) in cooperation with the gate array logic 42.

FIG. 2 shows a configuration of the intelligent battery 52 comprising an abnormal charging protection function in the embodiment. The intelligent battery 52, to which the embodiment is applied, comprises in the battery pack a CPU 61 that is a microcomputer to perform processes for abnormal charging protection, a voltage detection circuit 63 for detecting voltage of battery cells 62 and notifying the CPU 61, and a current detection circuit 64 for measuring current flowing in the battery cells 62 and notifying the CPU 61. It also comprises a discharging-stop FET 65 (FET3) for protecting the intelligent battery 52 in abnormal discharging, and a charging-stop battery FET 66 (FET4) for protecting the intelligent battery 52 in abnormal charging.

The CPU 61 inputs a signal from the voltage detection circuit 63, and A/D converts it inside to monitor the battery voltage. For example, in the case of lithium ion battery it is configured such that when voltage of the battery cells 62 reached 4.35 V or more per each one cell, it determines that abnormal charging is being performed and aborts charging by turning off the charging-stop FET 66 (FET4). Specifically, since voltage of the battery in full charged state (100%) is 4.2 V (±50 mV) per cell, the CPU 61 is adapted to detect abnormal charging at 4.35 V/cell in the light of detection error. The CPU 61, by communication utilizing a communication line (COM1), transmits information about detected abnormal charging to the embedded controller 41 (system-side), and also transmits to/receives from the embedded controller 41 (system-side), various types of information such as information about battery capacity or life.

FIGS. 3(a) and (b) show charging characteristics of a lithium ion battery. FIG. 3(a) shows a characteristic for normal charging, and FIG. 3(b) shows a characteristic for abnormal charging due to a failure. In FIGS. 3(a) and (b), the horizontal axis represents charging time (hours), and the vertical axis represents charging current (mA) and battery capacity (%) to show battery capacity and charging current. As shown in FIG. 3(a), in the normal charging, as the battery capacity increase to a certain value (60% in FIG. 3(a)) or more, the charger changes its state from constant current charging to constant voltage charging, then the charging current decreases. For example, in a typical charging manner, when the charging current value reach about 300 mA or less, it is determined that full charging is achieved, then the charging-stops.

However, when main system is in power-off state, if a short-circuit failure occurs in the FET3 or FET4, an abnormal charging like the one shown in FIG. 3(b) takes place. In the example shown in FIG. 3(b), the AC adapter 51 has a characteristic of, for example, a constant voltage of 16 V and a constant current of 3.3 A (3300 mA). When a short circuit occurs, the charging of the battery take place at 3.3 A until the charging is aborted, specifically, until the charging is aborted by the-protection circuit (charging stop FET 66), which, when the voltage per cell reaches 4.35 V or more, determines that abnormal charging takes place, then operates. When the main system is in operation, since the power is also fed to the main system, the charging current is low, for example 2.0 A, but the charging of the battery also continues until the protection circuit (charging stop FET66) operates.

Therefore, in this embodiment, the determination of malfunction occurrence in the battery is made by taking relationship between the battery capacity and the charging current.

FIG. 4 shows a relationship between battery capacity and charging current during normal charging. In FIG. 4, the horizontal axis represents battery capacity (%), and the vertical axis represents charging current (mA). As shown in FIG. 4, as battery capacity increases, typically, charging current decreases. Accordingly, when too large current flows for a battery capacity, it is possible to determine that a malfunction occurs. Specifically, it is possible to predetermine a current value by which a malfunction is detected, and to detect malfunction occurrence as soon as the detected charging current increases too much for the current value.

FIGS. 5(a) and (b) show an example of determination criteria for malfunction detection, which is used in this embodiment. FIG. 5(a) shows an example of a table for malfunction detection. FIG. 5(b) shows a relationship between abnormal current detection threshold value and the abnormal current according to the example of the FIG. 5(a). By referring to the table shown in FIG. 5(a), when a battery capacity (%) large current more than the value shown in the table is detected, it is possible to determine that a malfunction occurs. For example, as shown in FIG. 5(b), it is possible, as soon as current of 3.3 A flows, to detect that it is an abnormal current. It is also possible, when current of 2.0 A flows, to determine that there is a malfunction at a time of battery capacity of 81%. In any of these cases, since the battery capacity is less than 100%, and the protection circuit operates when the battery voltage is 4.20 V/cell or less, any safety problem does not occur. Regarding the values shown in FIG. 5(a), values of the battery capacity are represented as integers. Values between the integers may be approximated, for example, by rounding off.

Next, processes executed in this embodiment for achieving detection of abnormal state and protection functions will be described.

FIG. 6 shows a block diagram of a process executed in the CPU 61 of the intelligent battery 52. In this embodiment, it comprises a charging current measurement unit 71 for measuring charging current in response to output from the current detection circuit 64, and a battery capacity integration unit 72 for calculating battery capacity based on charging current measured by the charging current measurement unit 71, or based on the charging current and voltage from the voltage detection circuit 63. The battery capacity integration unit 72 can calculate battery capacity as electric charge amount (Ah) by integrating current value with respect to time, or battery capacity as electric energy (Wh) by integrating current value multiplied by voltage value, with respect to time.

In an abnormal current detection table 73, a table, for example as shown in FIG. 5(a) is stored. An abnormal current determination unit 74 compares value stored in the abnormal current detection table 73 and output results from the charging current measurement unit 71 and the battery capacity integration unit 72, then determines if there is a malfunction. A charging protection FET off instruction unit 75, when the abnormal current determination unit determines that there is a malfunction, cause the charging-stop FET 66 (FET4) to operate to abort the charging. A malfunction occurrence notification unit 76 is used in response to output of a malfunction occurrence from the abnormal current determination unit 74 for notifying the embedded controller 41 (system-side) of the occurrence of abnormal state.

FIG. 7 is a flow chart showing process flow in the case of using the table shown in FIG. 5(a). The CPU 61 of the intelligent battery 52 at first determines if charging is being performed or not (step 101). If charging is not being performed, then the process stands by, and if charging is being performed, then the charging current measurement unit 71 measures charging current value (step 102). Then, the battery capacity integration unit 72 derives integrated capacity (step 103). The abnormal current determination unit 74 determines if the integrated capacity is in the range of 0% to 70% (represented as approximation including decimals, same for later description), where 100% corresponds to the full capacity (step 104). If the condition is fulfilled, it is determined if the current value is 3.0 A or less, or not; if it is 3.0 A or less, then the process returns to step 101 with recognition of normality; if it is more than 3.0 A, then the process goes to malfunction processing with recognition of malfunction.

In the malfunction processing, in accordance with the charging protection FET off instruction unit 75, charging-stop process is performed by the charging-stop FET 66 (FET4) that is a protection circuit (step 106). Then, the malfunction occurrence notification unit 76 notifies the embedded controller 41 (system-side) of the malfunction occurrence (step 107). Then, in the system-side, the user is notified of the malfunction occurrence by using the LCD 18 (step 108), and the malfunction processing is completed.

If the condition of step 104 is not fulfilled at the abnormal current determination unit 74, it is determined if the capacity is in the range of 71% to 80%, or not based on table information stored in the abnormal current detection table 73 (step 109). If the capacity is in the range, it is determined if the current value is more than 2.5 A (step 110), or not. If the current value is within 2.5 A, then the process returns to step 101 with recognition of normality. If the current value is more than 2.5 A, then the process goes to malfunction processing of steps 106 to 108 with recognition of malfunction occurrence.

Similarly, it is determined, based on the table information stored in the abnormal current detection table 73, if the capacity is in the range of 81% to 90%, or not (step 111). If the capacity is in the range of 81% to 90%, then it is determined if the current is within 2.0 A (step 112), or not. If the current value exceeds 2.0 A, then malfunction processing of steps 106 to 108 is performed. Similarly, it is determined if the capacity is in the range of 91% to 95%, or not (step 113). If the capacity is in the range of 91% to 95%, then it is determined if the current value is within 1.3 A, or not (step 114). If the value exceeds 1.3 A, then the malfunction processing of steps 106 to 108 is performed. Further, similarly, it is determined if the capacity is in the range of 96% to 100%, or not (step 115). If the capacity is in the range of 96% to 100%, then it is determined if the current value is within 0.8 A (step 116), or not. If the current value exceeds 0.8 A, then the malfunction processing of steps 106 to 108 is performed. In the way described above, by sequentially referring to values in a table for malfunction detection, for example as shown in FIG. 5(a), detection of an abnormal state in the intelligent battery 52 is ensured.

Next, a detection method for detecting abnormal current by using numerical formulas instead of table information as shown in FIG. 5(a), which is stored in the abnormal current detection table 73, will be described. For example, it is possible to derive approximation formulas from the relationship between battery capacity and charging current as shown in FIG. 4, and to detect an abnormal state based on the approximation formulas. For example, from the relationship shown in FIG. 4, numerical formulas for detection of abnormal current are derived as follows:

$Y=3100$ (mA), for battery capacity $X \leq 70\%$; and $Y=(60X+6700)$ (mA), for 71% <battery capacity $X \leq 100\%$, where Y represents abnormal current value, and X represents battery capacity.

FIG. 8 is a flow chart showing a process flow for detection of abnormal state based on numerical formulas described above. In the CPU 61 of the intelligent battery 52, at first it is determined if charging is being performed or not (step 201). If charging is not being performed, then the process stands by. If charging is being performed, charging current is measured by the charging current measurement unit 71 (step 202), and integrated capacity is obtained by the battery capacity integration unit 72 (step 203). Then, an abnormal current value is calculated from the integrated capacity by using the numerical formulas described above (step 204). Then, the abnormal current value obtained at step 204 is compared with the charging current value measured at step 202 (step 205). If the charging current value does not exceeds the abnormal current value, then the process returns to step 201 with recognition of normal state.

If the charging current value exceeds the abnormal current value at step 205, charging is stopped by charging-stop FET 66 (FET4) that is a protection circuit (step 206). Then, the embedded controller 41 in system-side is notified of malfunction occurrence (step 207). Then, in the system-side, the malfunction occurrence is notified to the user through the LCD 18 (step 208), and the series of processes is completed.

As described above, in this embodiment, a mechanism for detecting abnormal charging in early stage and aborting the charging, is provided in the battery (intelligent battery 52). Even if the battery cell 62 itself has a short-circuit problem, safety for the intelligent battery 52 can be ensured unless charging with voltage that exceeds a predefined voltage because of abnormal charging is not performed. This embodiment can provide a system, which is also safer even if a short-circuit problem in the battery cell 62 itself and a problem of the charging circuit in the system-side occur. Additionally, when a malfunction is detected by the abnormal charging detection mechanism in the battery pack (intelligent battery 52), the charging can be aborted, and the problem occurrence can be notified to the user by notifying the system-side of the problem occurrence.

The relational characteristic as between battery capacity and charging current in normal charging, shown in FIG. 4, varies to some extent depending on the type of battery (manufacturer). However, the system-side does not need to know difference between the battery types or the like, since the abnormal current detection table 73 in the battery includes table information shown in FIG. 5(a), for malfunction detection, and the CPU 61 in the battery determines malfunction occurrence and activates the protection circuit. The CPU 61 in the battery pack, upon detection of a malfunction, activates the protection circuit (charging-stop FET 66 (FET4)) and notifies the system-side of the malfunction occurrence. The embedded controller 41, upon receiving notification of malfunction occurrence from the battery (intelligent battery 52), alerts the CPU 11 (the main processor). The CPU 11 that has received the alert can notify the user of the malfunction occurrence by displaying the malfunction occurrence on the LCD 18, CRT monitor or the like. In order to notify the user of malfunction occurrence, flashing LED or beep sound, for example, may be used.

Finally, an exemplary case will be described wherein the charger in the main system that is a notebook PC employs constant-current/constant-voltage charging method, and the external charger employs pulse-charging method. The abnormal charging detection mechanism in this embodiment can not used for a special-type charger that performs pulse-charging, for example, for lithium ion battery or lithium polymer battery. Pulse-charging is intended to perform rapid charging, in which large current flows in pulse form with a charging voltage higher than a typical charging voltage. In such a case, when the configuration described above is used without any modification, charging is aborted because it is determined that the charging current of the external charger is due to abnormal charging. In order to avoid this, a configuration is available, for example, wherein the device connected to the battery (intelligent battery 52) uses a communication line (COM1) for sending identification information for the device, or ID to the CPU 61 inside the battery. When CPU 61 recognizes connection of the battery to the main system by ID, the abnormal charging detection mechanism in this embodiment is enabled, and otherwise disabled. Such a configuration allows effective application of this embodiment in a possible case where the battery is connected to a charger with different charging modes.

As described above, the present invention provides a battery, which is safer even if dual accidental malfunctions occur.

What is claimed is:

1. A power supply system with a battery for supplying power to a main system, comprising:

a charging current measuring unit for measuring charging current for said battery;

a battery capacity calculating unit for calculating battery capacity of said battery;

and a detecting unit for detecting malfunction occurring in said battery based on a charging current value obtained by said charging current measuring unit and said battery capacity calculated by said battery capacity calculating unit.

2. The power supply system according to claim 1, further comprising a protection facility activating unit for activating a protection facility based on detection of malfunction occurrence by said detecting unit.

3. The power supply system according to claim 1, further comprising a notification unit for notifying said main system of malfunction based on detection of the malfunction occurrence by said detecting unit.

4. A computer device, comprising:

a main system for data processing; and an intelligent battery for supplying power to said main system, wherein said intelligent battery comprises:

a battery cell for charging and discharging, a current detection circuit for detecting charging current for said battery cell; and a CPU for calculating battery capacity by integrating charging current detected by said current detection circuit, and recognizing malfunction occurring in the battery based on charging current value detected by the current detection circuit and the calculated battery capacity.

5. The computer device according to claim 4, wherein said intelligent battery further comprises a protection circuit for performing stop operation according to instruction from the CPU based on recognition of malfunction occurrence by said CPU.

6. A battery for supplying power to an electric apparatus, comprising:

a charging current measuring unit for measuring charging current for a battery cell;

a battery capacity integration unit for integrating battery capacity for said battery cell; and a malfunction detecting unit for detecting malfunction occurrence based on a charging current value measured by said charging current measuring unit and battery capacity integrated by said battery capacity integration unit.

7. The battery according to claim 6, wherein said malfunction detecting unit detects malfunction occurrence based on information in a table for malfunction detection showing the relation between battery capacity and malfunction detection current value.

8. The battery according to claim 6, wherein said malfunction detecting unit detects malfunction occurrence based on an equation representing the relation between battery capacity and charging current value, which equation is separately defined according to battery capacity.

9. A battery, comprising:

a battery cell;

a voltage detection circuit for detecting voltage for said battery cell;

a current detection circuit for detecting charging current for said battery cell;

a charging stop unit for stopping charging for said battery cell; and a control unit for activating said charging stop unit based on voltage detected by said voltage detection circuit, wherein before the voltage reaches a voltage for activating said charging stop unit, said control unit detects a malfunction state based on a charging current value detected by said current detection circuit, and activates the charging stop unit.

10. The battery according to claim 9, wherein said control unit calculates capacity of said battery cell, and if the charging current value detected for the calculated capacity by said current detection circuit is larger than a normal value, determines that a malfunction has occurred.

11. The battery cell according to claim 9, wherein said control unit, when connected to an apparatus with a charger employing constant-current/constant-voltage charging mode, activates said the charging stop unit in response to said detection of malfunction.

12. A method for protecting a battery from abnormal charging, comprising:

measuring a charging current value for said battery;

calculating integrated capacity for said battery; and activating a protection facility when the charging current value measured for the calculated integrated capacity is larger than a predetermined value.

13. The method according to claim 12, wherein the protection facility is activated based on information specifying a reference value representing a charging current value at which a malfunction is detected for an integration capacity.

14. The method according to claim 12, wherein the protection facility is activated in a state where said integrated capacity is less than 100%.

15. A method for protecting an intelligent battery with a microcomputer from abnormal charging, comprising:

recognizing that said intelligent battery is connected to an apparatus with a charger for constant-current/constant-voltage charging;

measuring charging current value when said intelligent battery is charged while switching from constant-current charging to constant-voltage charging;

determining based on the measured charging current value whether abnormal charging occurs or not; and aborting charging when it is determined that abnormal charging occurs.

16. The method according to claim 15, wherein the connection to said apparatus is recognized by receiving the ID of said device.

17. The method according to claim 15, wherein when it is determined that abnormal charging occurs, said apparatus is notified of the occurrence of abnormal charging.

18. A program of software-based code for enabling a microcomputer contained in a battery to perform:

a charging function for measuring charging current value for said battery;

a calculating function for calculating integrated capacity in said battery; and a protecting function for activating a protection facility when the charging current value measured for the calculated integrated capacity is larger than a predetermined value.

19. A program for enabling a microcomputer contained in a battery to perform:

a function for recognizing that said battery is connected to an apparatus with a charger for constant-current/constant-voltage charging;

a function for measuring charging current value when said battery is charged while switching from constant-current charging to constant-voltage charging;

a function for determining based on the measured charging current value whether abnormal charging occurs or not; and a function for aborting charging when it is determined that abnormal charging occurs.

\* \* \* \* \*